US005244529A

United States Patent [19]

Siegel

[11] Patent Number: 5,244,529

[45] Date of Patent: Sep. 14, 1993

[54] SUBLIMATION AND HEAT TRANSFER MACHINE FOR IMPRINTING IMAGES UNTO MUGS

[75] Inventor: Irwin S. Siegel, Tempe, Ariz.

[73] Assignee: Thermagenics Technologies, Inc., Chandler, Ariz.

[21] Appl. No.: 935,568

[22] Filed: Aug. 26, 1992

[51] Int. Cl.[5] ........................ B32B 35/00; B41F 16/00

[52] U.S. Cl. .................................. 156/384; 156/475; 156/481; 156/492; 156/540; 156/583.3; 156/583.8; 156/230; 156/277; 101/35

[58] Field of Search ............... 156/240, 384, 381, 542, 156/583.3, 540, 541, 475, 481, 492

[56] References Cited

U.S. PATENT DOCUMENTS

| | | | |
|---|---|---|---|
| 4,658,721 | 4/1987 | Mathis | 101/9 |
| 4,842,613 | 6/1989 | Purser | 8/471 |
| 4,844,770 | 7/1989 | Shiraishi et al. | 156/387 |
| 4,874,454 | 10/1989 | Talalay et al. | 156/359 |
| 4,923,848 | 5/1990 | Akada et al. | 503/227 |
| 4,943,684 | 7/1990 | Kramer | 428/34.4 |
| 4,989,508 | 2/1991 | King | 101/35 |
| 5,019,193 | 5/1991 | Aramini | 156/240 X |

*Primary Examiner*—David A. Simmons

*Assistant Examiner*—M. Curtis Mayes

*Attorney, Agent, or Firm*—Antonio R. Durando; Harry M. Weiss

[57] ABSTRACT

A sublimation transfer device for mugs that consists of a cuff lined with multiple layers of material designed to improve the uniformity of the pressure and temperature distributions over the transfer surface. The cuff comprises a metallic support band with two ends that are wrapped around the mug and pushed toward each other to tighten the cuff's grip and increase the pressure exerted on the outside surface of the mug. The tightening of the band is effected by a double-source tensioning force that increases the uniformity of the pressure and temperature distributions. The interior surface of the cuff is first lined with a layer of variable-density foam, having heavier foam at the edges and lighter foam at the center, which under pressure conforms more precisely to the surface of the mug than uniform-density foam. A high-temperature electrical-heater tape is then attached to the inside surface of the foam and is lined with a heat-distributing metallic foil coated with Teflon® similar nonstick material. The device is also provided with a mug positioner designed to optimize the pressure distribution over the transfer surface during the tensioning of the cuff.

13 Claims, 3 Drawing Sheets

SUBLIMATION AND HEAT TRANSFER MACHINE FOR IMPRINTING IMAGES UNTO MUGS

BACKGROUND OF THE INVENTION

1. Field of the Invention

This invention is related to the general field of sublimation and heat transfers and, in particular, to an improved machine for transferring images onto cylindrical mugs.

2. Description of the Prior Art

Sublimation is the physical transformation of a solid directly into vapor at a certain pressure and temperature, bypassing the liquid state in the process; it occurs in the case of some substances, such as dry ice, that have a lower vapor pressure in liquid than in solid form. Since various kinds of inks with this property have been discovered, the process of sublimation has been used to imprint images on articles of manufacture directly from sublimable, image-bearing, dyes printed on a substrate. The image on the substrate is placed in direct contact with a surface capable of receiving and retaining the vaporized dyes and it is heated to a temperature at least as high as the sublimation temperature of the various inks constituting the image. Thus, the image is transferred directly onto the surface of the article by vaporization of the dyes constituting the image and by their immediate absorption into the polymeric coating.

A similar process occurs by thermal transfer of dyes capable of diffusing from an image bearing substrate into the polymeric fabric of the coating in the receiving surface. The same equipment and general operating conditions and issues apply to both processes.

Since all substances in vapor form tend to expand, a true-image transfer can be achieved only if the sublimated dyes are captured by the polymeric coating as soon as they vaporize. Therefore, direct contact under pressure between the dyes and the coating is essential for a good-quality transfer. This in turn requires a high operating temperature because the temperature of sublimation of a substance is directly related to the pressure to which the substance is subjected. Thus, in order to improve the sublimation transfer process, a high transfer pressure and, correspondingly, a high operating temperature must be utilized, among other factors. In addition, both pressure and temperature must be uniformly distributed over the transfer surface in order to avoid blurs and distortions in the transferred image that may result from hot or cold spots and from non-uniform contact between the image-bearing substrate and the receiving surface. Typically, sublimation transfers to ceramic and glass surfaces have been performed by applying heat to the bearing substrate for 10 to 20 seconds at temperatures between 200 and 450 degrees Fahrenheit and pressures from 2 to 30 psig.

These general principles have been utilized to develop several processes and equipment for transferring images to the surface of mugs and similar articles by sublimation. For example, U. S. Pat. No. 4,842,613 to Purser (1989), U. S. Pat. No. 4,844,770 to Shiraishi et al. (1989) and U. S. Pat. No. 4,923,848 to Akada et al. (1990) describe various techniques and equipment to effect sublimation transfers. In particular, U. S. Pat. No. 4,874,454 to Talalay et al. (1989) discloses a sublimation transfer device that utilizes a flexible heating pad that is pressed against the curved surface of a mug by an enveloping tensioning belt. Similarly, U. S. Pat. No. 4,943,684 to Kramer (1990) describes a sublimation machine comprising two heated jaws for clamping and transferring images to the two sides of a cylindrical mug.

The main problem encountered with existing equipment is the quality of the image resulting from the sublimation transfer. Fading of colors, distortions, lack of sharpness, all result from uneven pressure and temperature distributions over the transfer surface, which in turn depend on the physical structure and functional features of the apparatus used to effect the transfer. For example, the device described in the Talalay et al. patent operates on the principle of a transfer substrate pressed against the receiving surface of a mug by an enveloping belt under tension, as illustrated in FIG. 1. The mug M, seen in top view, is inserted into the loose cuff C formed by the belt B when no tension is applied to it. A heater H and an image-bearing substrate S line the inside surface of the cuff, so as to be in direct contact with the outside surface of the mug, onto which the image is to be transferred. The belt B is looped around two supporting rollers R attached to the frame of the device, and the belt can be tightened by applying a tensioning force on one end of the belt (as in the direction of the arrow A1), or loosened by releasing the force, while the other end of the belt is anchored to a fixed support F. In operation, the belt B is tightened to induce pressure on the image in contact with the mug's surface and the heater is actuated to cause the transfer by sublimation.

From the structure just described, it is easy to see that the pressure on the transfer surface results from the shortening of the belt B over the fixed circumference of the mug M. Given the fixed position of the rollers R and of the support F, the pressure at each point on the surface of the mug enveloped by the belt is produced by the single-source tensioning force pulling the belt, the active component of which is a force in the direction of arrow R. Thus, the actual pressure exercised by the interior surface of the belt at any point on the surface of the mug is measured by the perpendicular force resulting at that point from the effects of the friction between the two surfaces as the belt is tensioned, from the deformation of the belt as it stretches under tension, and from the ability of the layers lining the belt to conform to the surface of the mug. Obviously, a very complicated set of forces is at work while the mug is being compressed by the belt through the application of a single-source tensioning force, and the best one can hope for is a uniform approximation to a constant pressure distribution. In addition, the stresses imparted to the heater H and the substrate S by the repeated tensioning and releasing of the belt cause them to develop creases that effect the heat distribution over the image, as well as the pressure distribution, thus affecting the quality of the transfer. Therefore, there still exists a need for a sublimation transfer device that achieves a more uniform distribution of pressure and temperature over the transfer surface to obtain a sharper and unblemished image.

BRIEF SUMMARY OF THE INVENTION

One objective of this invention is the development of a sublimation transfer device that improves the uniformity of the pressure applied to the transfer surface.

Another objective of this invention is a device that utilizes high pressure at the point of contact between the sublimation transfer image and the receiving surface in order to minimize distortions caused by the gasification and related expansion of sublimated material.

Another goal of this invention is a sublimation transfer device that also improves the uniformity of the temperature applied to the transfer surface.

A further goal of the invention is a device with improved heat transfer in order to decrease the time required for carrying out a sublimation transfer.

Yet another goal of the invention is a device that can be used to transfer images that wrap around most of the exterior surface of a mug, so that, with the exception of the handle, a continuous design can be transferred to cover the entire mug in a single operation.

A final objective is the easy and economical manufacture of the invention according to the above stated criteria. This is achieved by using commercially available components and materials in a novel combination and with structural modifications designed to increase the efficiency of the invention.

According to these and other objectives, the present invention consists of a sublimation transfer device for mugs that consists of a cuff lined with multiple layers of material designed to improve the uniformity of the pressure and temperature distributions over the transfer surface. The cuff comprises a metallic support band with two ends that are wrapped around the mug and pushed toward each other to tighten the cuff's grip and increase the pressure exerted on the outside surface of the mug. The tightening of the band is effected by a double-source tensioning force that increases the uniformity of the pressure and temperature distributions. The interior surface of the cuff is first lined with a layer of variable-density foam, having heavier foam at the edges and lighter foam at the center, which under pressure conforms more precisely to the surface of the mug than uniform-density foam. A high-temperature electrical-heater tape is then attached to the inside surface of the foam and is lined with a heat-distributing metallic foil coated with Teflon ®, chemical name polytetrafluoroethylene, or similar nonstick material. The device is also provided with a mug positioner designed to optimize the pressure distribution over the transfer surface during the tensioning of the cuff.

Various other purposes and advantages of the invention will become clear from its description in the specifications that follow and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DETAILED DESCRIPTION OF THE INVENTION

This invention consists of the combination of known mechanical, thermal and electrical principles to develop an improved device for transferring images from a sublimation substrate onto the exterior surface of a mug. The invention is primarily based on the recognition that the quality of sublimation transfers is enhanced by the application of uniform pressure and temperature over the transfer surface; therefore, it comprises numerous features designed to produce and maintain such even distributions of conditions during the sublimation transfer process.

Figure 1:
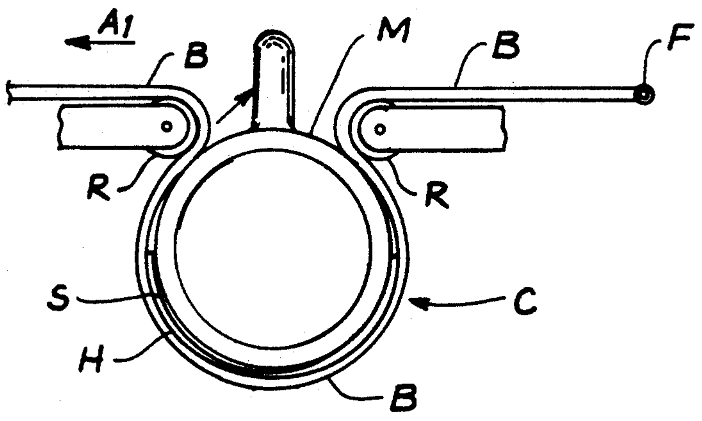
Fig. 1 (Prior Art)
FIG. 1 is a schematic elevational view of a prior-art mug sublimation transfer device using an enveloping belt with a single-source tensioning force.
Figure 2:
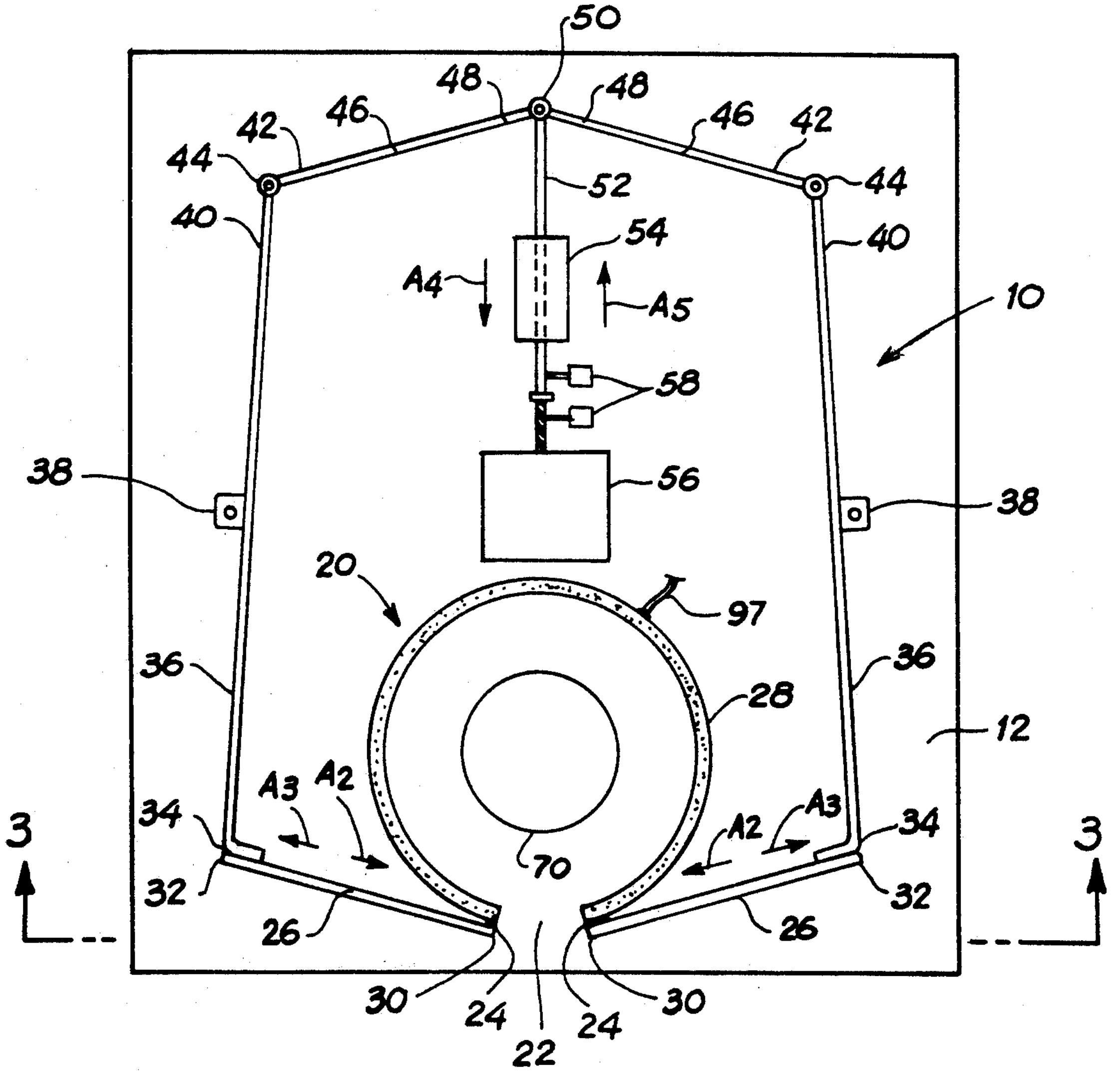
FIG. 2 shows a schematic plan view of the preferred embodiment of a sublimation transfer device according to this invention illustrating the configuration of the double-source tensioning mechanism used to press the sublimation transfer image on the receiving surface of a mug.
Figure 3:
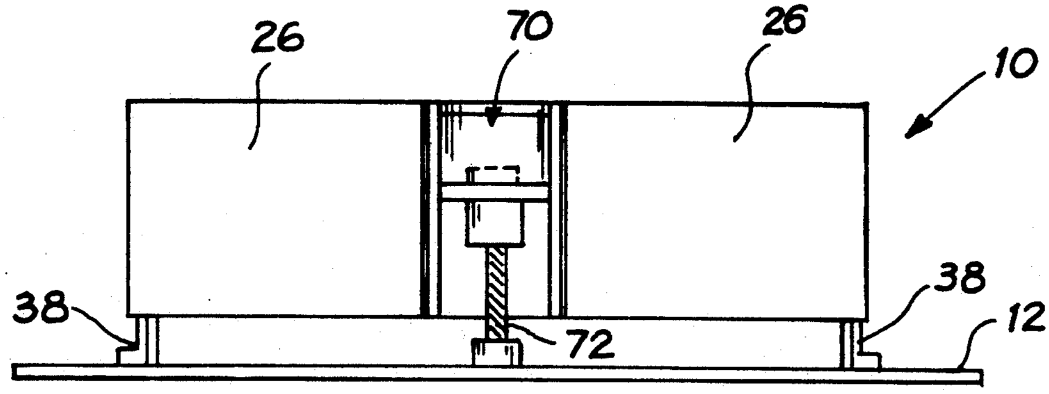
FIG. 3 is a frontal view taken from line 3—3 in FIG. 2.
Figure 4:
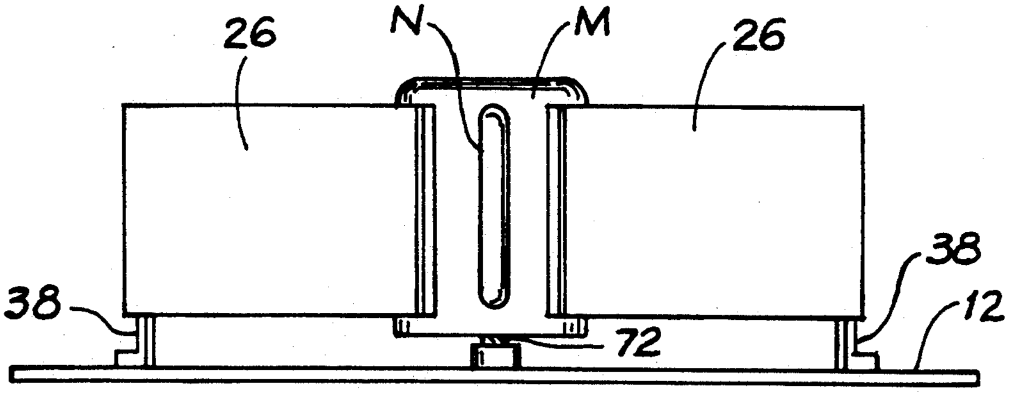
FIG. 4 is the same view as FIG. 3 including a conventional mug seated on a cup positioner located within the cuff of the invention.

Referring to the drawings, wherein like parts are referenced throughout with like numerals and symbols, FIG. 2 shows a schematic plan view of the preferred embodiment of a sublimation transfer device 10 according to this invention and illustrates the configuration of the mechanism used to press the sublimation transfer image over the receiving surface of a mug. FIG. 3 is a frontal view taken from line 3—3 in FIG. 2. The device 10 comprises a transfer cuff 20 disposed substantially on a horizontal plane around a vertical cup positioner 70 attached to a bottom support platform 12 and disposed in vertical coaxial relationship with the cuff. The cuff 20 defines an approximately cylindrical surface with a vertical opening 22 between its two expandable converging ends 24, each of which is attached to a supporting arm 26. Thus, an approximately cylindrical, conventional cup or mug M can be inserted upside down into the cuff with its handle N extending through the opening 22 and seated vertically on the positioner 70, as illustrated in the front view of FIG. 4. In this position, the exterior surface of the wall of the mug, which in operation is lined with the image-bearing substrate, can be brought into contact with the interior surface of the cuff 20 by clamping its ends 24 to the point where the mug is no longer free.

The first important feature of this invention concerns the double-action mechanism used to clamp the mug M within the cuff 20. The ends of the cuff are attached to two support arms 26 that cause the perimeter of the cuff to contract or expand as the arms move toward or away from each other in the directions illustrated in FIG. 2 by arrows A2 and A3, respectively, along lines that lie tangentially to the perimeter of the cup. As will be detailed below, the cuff 20 comprises an exterior metallic band 28 with multiple layers of different materials lining its interior surface. Each support arm 26 is positioned tangentially to the band 28 with a first end 30 flexibly connected, such as by a hinge or a resilient connection between the two ends, to one end 24 of the band 28, so that the deformation of the approximately cylindrical geometry of the cuff is minimized as the support arms 26 push or pull the band's ends 24. The second end 32 of each support arm 26 is rigidly attached to a first end 34 of a lever arm 36 that is pivotally fastened to a fulcrum 38 affixed to the support platform 12. For best space utilization in the layout of the various components constituting the device 10 of the invention, we found it convenient to attach the support arms 26 and the lever arms 36 at an approximately right angle, resulting in the latter being positioned roughly in parallel to one another along the length of the support platform 12. The second end 40 of each lever arm 36 is hingedly fastened to a first end 42 of a corresponding push arm 46, forming an obtuse angle therewith at the hinges 44; and the second ends 48 of both push arms 46 are connected through a common drive hinge 50, which is also hingedly attached to a drive shaft 52 which is preferably equally spaced between the two push arms 46, forming equal acute angles therewith. Finally, the shaft 52, through a supporting bearing block 54, is connected to a drive mechanism 56 capable of producing the longitudinal movement of the shaft under load. The mechanism 56 may consist of a reversible motor actuating a gear acting on threads on the shaft 52, or any equivalent means for effecting the reversible longitudinal motion of the shaft 52. In the preferred embodiment of the invention, a reversible electric motor actuates a gear drive connected to a cam that in turn is connected to the drive shaft 52. The motion of the cam has two end positions, corresponding to a closed and open cuff, respectively, which are alternately reached by the cam as a result of the alternately reversed motion of the motor. The switching of the motor is controlled by a timer and set by the user according to the estimated time required to achieve the sublimation transfer. A timer allowing selections between 60 and 90 seconds is adequate to practice the invention.

From the lever geometry just described, it is apparent that the diameter of the cuff 20 will decrease when the drive shaft 52 is pulled by the mechanism 56 in the direction of arrow A4, causing a mug M seated on the positioner 70 to become tightly clamped within the cuff. Conversely, the opposite motion of the shaft (in the direction of arrow A5) will result in the release of the mug. The drive mechanism 56 is controlled by limit switches 58 calibrated to provide the desired degree of clamping and opening of the cuff to ensure that the mug can be inserted and clamped at the desired pressure for the sublimation transfer process. Thus, when the lever mechanism is actuated, the tangential double action of the two support arms 26 cause the cuff 20 to clamp the mug from opposite sides, resulting in a symmetrical (and therefore more uniform) distribution around the mug of the forces exerted on the ends 24 of the metallic band 28 in the cuff.

Figure 5:
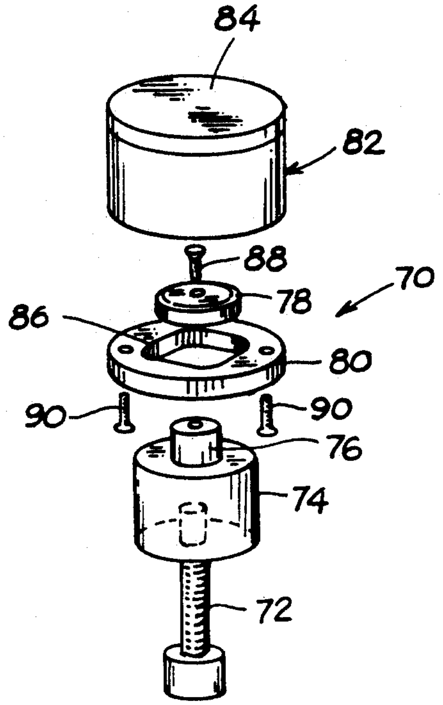
FIG. 5 illustrates the cup positioner of the invention in perspective exploded view.

A further improvement in the distribution of forces is provided by the vertical arrangement of the cuff and mug seated on the positioner 70. The positioner consists of a fixed base supporting a floating head on which the cup is seated upside down. Thus, the cup is able to move freely horizontally within the space bound by the inside wall of the cuff. In particular, as shown in the exploded perspective view of FIG. 5, the fixed base of the preferred embodiment of the positioner 70 comprises a vertical threaded stud 72 attached to the platform 12, a coaxial support table 74 screwably fastened to the stud and containing a neck 76 projecting upward along its axis, and a coaxial stopper 78 detachably connected thereto. The floating head comprises a collar 80 and a hollow cylindrical head 82 with a solid top-end plate 84 over which the mug is placed. The vertical threaded stud of the base 72 is adapted to be received in a corresponding threaded aperture in the bottom of the table 74, so that the elevation of the table may be adjusted by rotating the table to either screw or unscrew the stud from the aperture. The collar 80 consists of a thin cylindrical structure (disk) with a smooth surface made of or coated with anti-friction material, such as Teflon®, intended to freely and easily slide over the top of the support table 74. The collar is thinner than the neck 76 and contains a rhombic (diamond-shaped) opening 86, which is wider than the diameter of the neck 76 but smaller than that of the stopper 78. Thus, the collar can be locked loosely around the neck 76 by inserting the neck through the opening 86 and fastening it to the stopper 78 through a screw 88 or equivalent means. The collar 80 is then attached to the bottom of the cylindrical structure 82 via screws 90 or any other fastening means, so that the head 82 becomes loosely attached to the fixed support table 74, the collar being able to float over the table within the constraints of the free space between the neck 76 and the walls of the rhombic aperture 86. In addition, depending on the relative sizes of the various components, the motion of the head 82 may also be limited by the stopper 78 butting against the inside wall of the cylindrical head.

Figure 6:
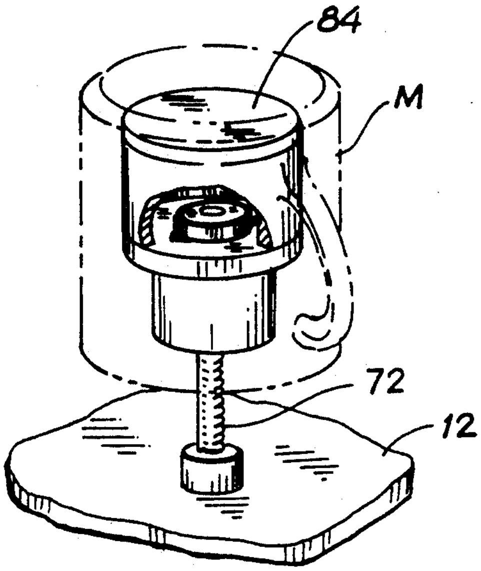
FIG. 6 is a perspective view of the positioner of FIG. 5 with a cut-out portion illustrating the assembly of the various pieces and a mug in phantom line seated over the top of the positioner.

Thus, the positioner 70 provides a convenient and effective tool to optimize the position of the mug within the cuff during the clamping operation. As shown in FIGS. 3 and 6, the mug M is seated upside down on the top plate 84 of the positioner's head, which is preferably coated with a high-friction heat-resistant material, such as silicone rubber, to secure the position of the mug on the positioner. As the cuff 20 of the invention begins clamping around the mug, its contact with the outside surface of the mug will necessarily be non-uniform because of the fact that the tightening action is only approximately concentric. By virtue of the positioner's freedom to move horizontally, the mug is able to continuously adjust its position with respect to the surrounding cuff so as to evenly distribute the clamping force around its perimeter. The result is a much more uniform pressure distribution over the surface of the mug than could be attained, even with a double-action clamping mechanism, using a stationary vertical mug stand or, as in the case illustrated in the U. S. Pat. No. 4,874,454, letting the mug lie horizontally in the cuff.

Although the floating-head configuration described above can be implemented with different materials and collar apertures and dimensions, we found that best results are obtained with a head 82 having a Teflon®-coated collar with a rhombic opening 86 with a minor and a major axis about 1 inch and 1 and $\frac{3}{8}$ inches long, respectively. In combination with a neck and stopper having diameters approximately 11/32 of an inch and 1 inch long, respectively, such head is able to adjust rapidly to any pressure exerted at any point along the surface of the cup seated on it by the sliding motion of the collar 80 over the top of the table 74.

Figure 7:
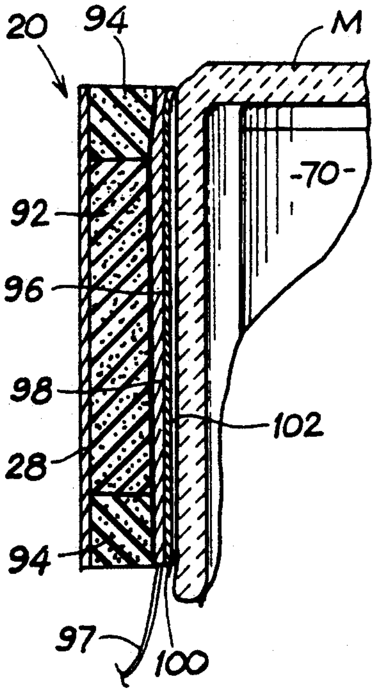
FIG. 7 illustrates in cross-sectional view the various components lining the interior of the metallic band of the cuff as it envelopes a substrate bearing a sublimable image adhered to the outside surface of a mug.

Referring now to the multilayer construction of the cuff 20 of the invention, FIG. 7 illustrates in cross-sectional view the various components lining the interior of the metallic band 28 of the cuff as it envelopes a substrate bearing a sublimable image adhered to the outside surface of a mug. The first layer of material lining the metallic band comprises two kinds of heat resistant foam to provide the cuff with the necessary resilience to conform to the surface of the mug during the clamping operation. As mentioned above, this capacity for conformance is essential for good contact under pressure, which is necessary to ensure high definition and low distortion during the sublimation transfer process. Therefore, an inner portion 92 of lighter foam, such as the soft grade of expanded closed-cell silicone foam marketed by the Groendyk Manufacturing Company, Inc. of Buchanan, Virginia, is used to line the interior of the band 28, and a heavier portion 94, such as the medium grade of the same silicone foam, is used to line each outer perimeter of the band. Although different layer thicknesses are acceptable, we found that a thickness in the approximate range between 0.25 and 0.50 inches (wherein ⅜ of an inch is preferred) yields maximum conformance of the cuff to the surface of the mug. Because of the denser composition of the foam around its outer perimeters, the cuff is able to utilize better the pressure exerted on the surface of the mug to maximize contact at the edges, even if the surface of the mug is slightly curved inward, as illustrated in the upper edge of the cuff in FIG. 7. We found that the addition of two outer layers 94 approximately ⅜ inches thick and ⅜ inches tall greatly enhances the quality of the image obtained at the edges of the transfer surface area.

The next layer consists of a flexible electric heater 96 comprising a wound heater wire embedded in a high-temperature silicone medium. Exterior electric wiring 97 is provided for connection with a power source and control circuitry. Heaters of this type are available commercially from various manufactures, such as the R. G. Matthews Company of Grass Valley, California, in different wattage and temperature ratings. Given the relatively high operating pressure selected for sublimation transfer in this device (estimated at approximately 60 psig), we found that a 1,000 watt heater capable of temperatures in the 500° to 685° F. range is optimal for effecting a sublimation transfer of standard sublimable dyes in 60 to 90 seconds.

Finally, in order to improve the heat distribution during the heating phase of the process, a thin layer 98 of aluminum or other highly conductive metal, coated toward the inside of the cuff with a layer 100 of non-stick medium (such as Teflon®), is used in direct contact with the heater layer 96. Because of its high thermal conductivity, the aluminum layer distributes the heat generated by the heater evenly throughout the surface of the substrate 102 containing the sublimation transfer image. Obviously, the non-stick medium layer 100 is added to minimize damage to the transferred image that might otherwise be caused by the adhesion of the substrate to the aluminum surface.

As would be obvious to those skilled in the art, all layers in the cuff 20 can be attached to one another by heat-resistant adhesives or equivalent fastening means. It is important to note that this cuff adopts many features found in prior art that are modified to improve the overall performance of the device. In addition to the generally higher pressure and temperature of operation and the inclusion of variable density foam, the invention also inverts the order of layering suggested in the published literature. Accordingly, the heating layer 96 is disposed closer to the sublimation substrate and directly adjacent to the aluminum layer 98 for maximum heat distribution, backed by the foam layers 92 and 94. This configuration is more thermally efficient than having a foam layer between the heater and the heat distribution layer, which is the configuration disclosed in the U. S. Pat. No. 4,874,454 referenced above.

In addition to the new features described above, the performance of the sublimation transfer machine of this invention can be refined by the inclusion of other features available in conventional devices of this type. For example, the electrical wires 97 of the heating element embedded in the silicone layer 96 of the cuff can be energized through a calibrated rheostat to regulate the temperature of operation during the sublimation transfer. We found that the best operating temperature for most transfers is between 500° and 525° F., but a 500° to 675° F. range is advisable for versatility of application. Similarly, the switches 58, or equivalent limiting devices, could be made adjustable to vary the clamping pressure of the cuff 20 in order to be adapted to different diameter mugs. Obviously, the electric heater and drive mechanism are energized from an electric power source, such as a standard 110 V power outlet, through a control switch. As in the case of other devices described in the prior art, the drive mechanism 56 is first energized to operate in one direction causing the compression of the cuff around the mug, as determined by one of the limit switches 58, and is then reversed to operate in the opposite direction after a period of time measured by a timer and set by the operator. As mentioned above, we found that the optimal time range for sublimation transfer under the conditions of this machine is 60 to 90 seconds. When the drive mechanism is reversed, the cuff is opened to release the mug, as controlled by another limit switch 58, and the machine is ready for another cycle.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein, but is to be accorded the full scope of the claims so as to embrace any and all equivalent apparatus and methods.

What I claim as my invention is:

1. A device for transferring images onto the outer surface of a mug coated with a substance receptive to dyes and lined with an image-bearing substrate, comprising:

(a) a transfer cuff disposed substantially horizontally on a supporting platform and defining an approximately cylindrical vertical surface having two expandable converging ends, so that a mug having a handle can be placed therewithin with the handle extending outward between said converging ends, and so that the image-bearing substrate lining the exterior surface of the mug can be brought into contact with the interior surface of the cuff by clamping said two converging ends to the point where the mug is no longer free;

(b) clamping means independently attached to each of said two converging ends for causing them to move toward or away from each other as said clamping means contracts or expands through a double-action mechanism;

(c) a flexible electric heater incorporated into the inner structure of said transfer cuff to provide heat to the image-bearing substrate lining the mug clamped therewithin, thus causing the transfer of the image from the substrate to the surface of the mug; and (d) a mug positioner, disposed in vertical coaxial relationship with said cuff, consisting of a fixed base supporting a floating head on which the cup is seated upside down, so that the cup is able to move freely horizontally within the space bound by the cuff as the cup is being clamped by said cuff.

2. The device described in claim 1, wherein said fixed base of the positioner comprises a vertical threaded stud attached to said platform, a coaxial support table screwably fastened to the stud for vertical adjustment by rotation of the table to either screw or unscrew the stud from the table and containing a neck projecting upward along the axis of the table, and a coaxial stopper detachably connected to said neck; wherein said floating head comprises a collar removably attached to a hollow cylindrical head with a solid top-end plate over which the mug is placed during operation of the device; said collar consisting of a disk structure with a smooth surface intended to freely slide over said support table and said disk structure being thinner than said neck and containing a rhombic opening which is wider than the diameter of the neck but smaller than that of the stopper, so that the collar can be locked loosely around the neck by inserting the neck through the opening and fastening it to the stopper.

3. The device described in claim 2, further comprising a high-friction heat-resistant material attached to said solid top-end plate of the floating head to secure the position of the mug on the positioner.

4. The device described in claim 3, wherein said high-friction heat-resistant material is silicone rubber.

5. The device described in claim 2, wherein said floating head features a hollow cylindrical head with a collar coated with low-friction material having a rhombic opening with a minor and a major axis about 1 inch and 1 and $\frac{3}{8}$ inches long, respectively, in combination with a neck and stopper having diameters approximately 11/32 of an inch and 1 inch long, respectively.

6. The device, described in claim 5, wherein said low-friction material is polytetrafluoroethylene.

7. The device described in claim 1, wherein said transfer cuff features a multilayer structure comprising an exterior metallic band lined on the inside with a first layer comprising two kinds of heat-resistant foam, wherein the inner portion of the layer consists of lighter foam and the two outer-perimeter portions consist of heavier foam; and wherein the inside surface of said first layer is further lined with a second layer consisting of a flexible electric heater comprising a wound heater wire embedded in a high-temperature silicone medium.

8. The device described in claim 7, wherein said first layer of heat-resistant foam is between 0.25 and 0.50 inches thick.

9. The device described in claim 8, wherein said first layer of heat-resistant foam is approximately $\frac{3}{8}$ of an inch thick and said outer portions are approximately $\frac{3}{8}$ inches thick and $\frac{3}{8}$ inches tall.

10. The device described in claim 7, wherein said flexible electric heater comprises a 1,000 watt heater capable of temperatures in the 500° to 685° F. range.

11. The device described in claim 7, further comprising a thin layer of highly conductive metal coated toward the inside of the cuff with a layer of non-stick medium.

12. The device described in claim 11, wherein said highly conductive metal is aluminum.

13. The device described in claim 11, wherein said non-stick medium is polytetrafluoroethylene.

* * * * *